US007059894B1

(12) United States Patent
Huang

(10) Patent No.: US 7,059,894 B1
(45) Date of Patent: Jun. 13, 2006

(54) BATTERY SEAT

(76) Inventor: Huang-Chou Huang, No. 377, Fu-Teh First Rd., Hsi-Chih, Taipei Hsien (TW)

( * ) Notice: Subject to any disclaimer, the term of this patent is extended or adjusted under 35 U.S.C. 154(b) by 0 days.

(21) Appl. No.: 11/010,399

(22) Filed: Dec. 14, 2004

(51) Int. Cl.
*H01R 3/00* (2006.01)

(52) U.S. Cl. ...................................................... 439/500

(58) Field of Classification Search ................ 439/500; 429/100, 96

See application file for complete search history.

(56) References Cited

U.S. PATENT DOCUMENTS 3,181,974 A * 5/1965 La Barben .................. 429/100
5,922,489 A * 7/1999 Adachi ....................... 429/100
5,980,309 A * 11/1999 Frantz et al. ............... 439/500
6,124,056 A * 9/2000 Kimura ...................... 429/100
6,527,584 B1 * 3/2003 Ninomiya ................... 439/500
2003/0068547 A1 * 4/2003 Wu ............................ 429/99
2004/0137786 A1 * 7/2004 Yu ............................ 439/500

* cited by examiner

*Primary Examiner*—Phuong Dinh
(74) *Attorney, Agent, or Firm*—Rosenberg, Klein & Lee

(57) ABSTRACT

A battery seat has a base, a positive terminal and a negative terminal. The base has a bottom, a sidewall, a positive terminal seat, a negative terminal seat and a battery cavity. The sidewall, the positive terminal seat and the negative terminal seat are formed on the base, extend up from the base, are connected to each other and form the battery cavity. The positive terminal is mounted on the positive terminal seat. The negative terminal is mounted on the negative terminal seat. Because the sidewall, the positive terminal seat and the negative terminal seat are connected to each other and to the bottom of the base, the battery cavity is strong and robust. Even a significant crack in the sidewall will not degrade the integrity of the battery cavity, and the battery cavity will still hold a battery without letting the battery fall from the battery seat.

3 Claims, 7 Drawing Sheets

BATTERY SEAT

BACKGROUND OF THE INVENTION

1. Field of the Invention

The present invention relates to a battery seat and particularly to a battery seat that can securely hold a disk battery.

2. Description of Related Art

Disk batteries are used widely in normal daily life. Many miniature and pocket-sized machines such as "credit card" calculators have a battery seat inside them to hold a disk battery.

With reference to FIG. 7, a conventional battery seat comprises a base (50), a positive terminal (60) and a negative terminal (70).

The base (50) has a bottom, a front edge, a rear edge, a right edge, a left edge, two cutouts, a battery cavity (54), two stationary battery-clips (52), a negative terminal seat (53) and a positive terminal seat (51).

The cutouts are formed respectively in the right edge and the left edge of the base (50). The battery cavity (54) is formed on the base (50). The stationary battery-clips (52) are formed at the front edge of the base (50) and extend up from the bottom of the base (50). The negative terminal seat (53) is formed on the bottom of the base (50) between the clips (52). The positive terminal seat (51) is formed at the rear edge of the base (50) and extends up form the bottom of the base (50).

The positive terminal (60) is mounted in the positive terminal seat (51) and has a resilient clip (61) and an external lead. The resilient clip (61) is formed on the positive terminal (60), faces toward the base (50) and abuts and holds a positive terminal of a disk battery mounted in the battery cavity (54).

The negative terminal (70) is mounted on the negative terminal seat (53) and has a battery contact (71) and an external lead. The battery contact (71) is formed on the negative terminal (70), is mounted on the bottom of the base (50) and abuts a negative terminal of the disk battery mounted in the battery cavity (54).

The battery seat is installed in a machine by connecting the external leads of the negative terminal (70) and the positive terminal (60) to a circuit board of the machine. A disk battery is inserted into the battery cavity (54) by inserting the edge of the disk battery under the stationary battery-clips (52) with the negative terminal of the disk battery facing the base (50) and pressing the opposite edge down into the resilient clip (61) so the resilient clip (61) holds the bottom edge of the battery to keep the disk battery from falling out of the battery seat.

With reference to FIG. 8, improper or repeated installation and removal of the disk battery will cause permanent deformation in the stationary battery-clips (52) of the base (50). Excessive deformation of the stationary battery-clips (52) will cause the stationary battery-clips (52) to break. With the stationary battery-clips (52) broken, the battery seat will not hold the disk battery against the battery contact (71) on the negative terminal (70) to power the device to which the battery seat is attached.

To overcome the shortcomings, the present invention provides a battery seat to obviate or mitigate the aforementioned problems.

SUMMARY OF THE INVENTION

The primary objective of the present invention is to provide a battery seat that can hold a battery in a machine securely and is not as susceptible to deformation and damage as the conventional battery seat.

The battery seat in accordance with the present invention comprises a base, a positive terminal and a negative terminal. The base has a bottom, a sidewall, a positive terminal seat, a negative terminal seat and a battery cavity. The sidewall, the positive terminal seat and the negative terminal seat are formed on the base, extend up from the base, are connected to each other and form the battery cavity. The sidewall has a top inner edge and multiple lips formed separately on and extending radially inward from the top inner edge. The positive terminal is mounted on the positive terminal seat. The negative terminal is mounted on the negative terminal seat. Because the sidewall, the positive terminal seat and the negative terminal seat are connected to each other and to the bottom of the base, the battery cavity is strong and robust. Even a significant crack in the sidewall will not degrade the integrity of the battery cavity, and the battery cavity will still hold a battery without letting the battery fall from the battery seat.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
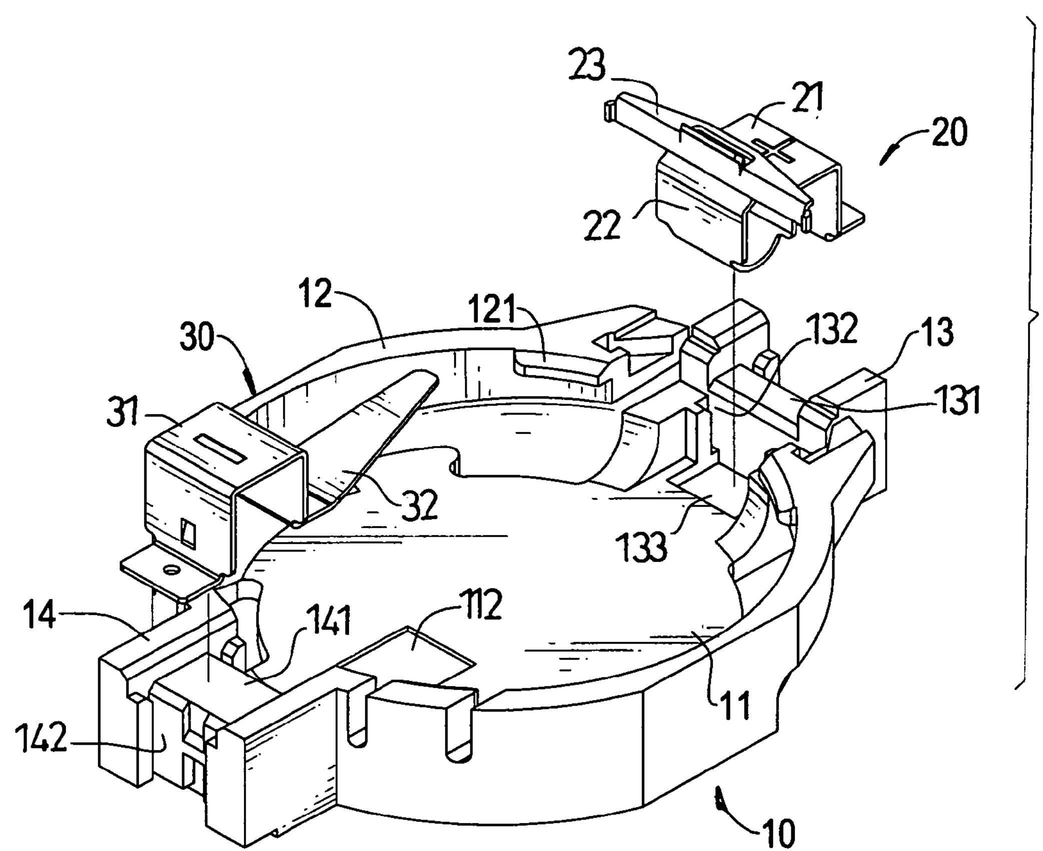
FIG. 1 is an exploded perspective view of a battery seat in accordance with the present invention.
Figure 2:
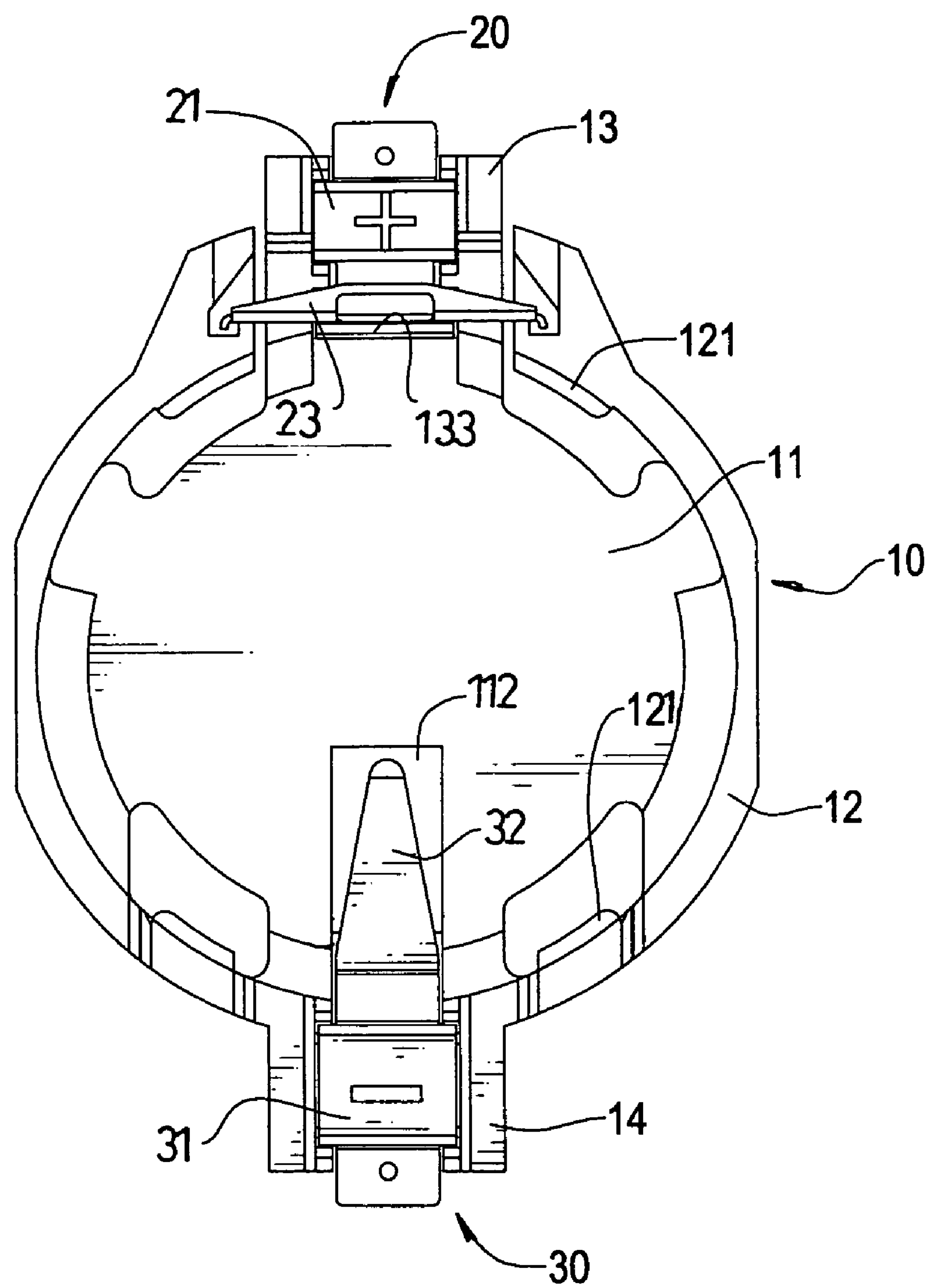
FIG. 2 is a top view of the battery seat in FIG. 1.
Figure 4:
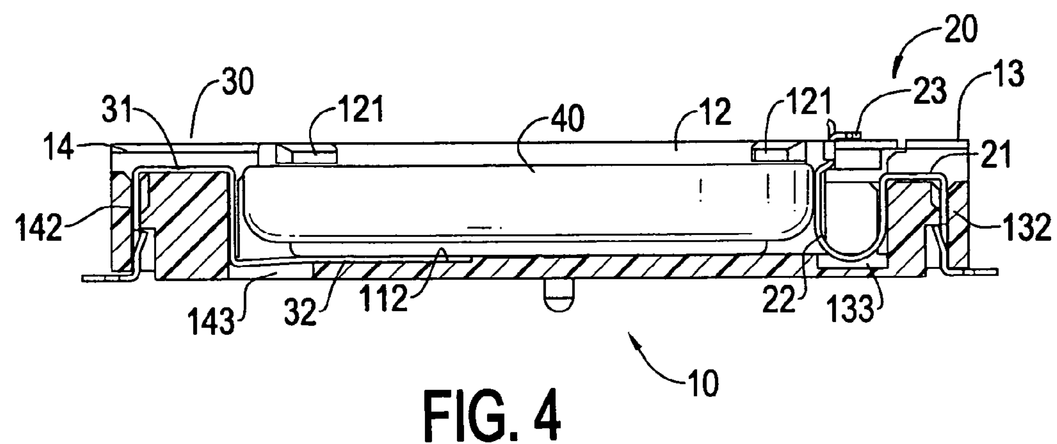
FIG. 4 is a side view in partial section of the battery seat in FIG. 3 with a battery installed.

With reference to FIGS. 1, 2 and 4, a battery seat in accordance with the present invention comprises a base (10), a positive terminal (20) and a negative terminal (30).

The base (10) has a bottom, an edge, a positive terminal seat (13), a negative terminal seat (14), a sidewall (12) and a battery cavity (11).

The positive terminal seat (13) is formed at the edge of the base (10), extends up from the bottom of the base (10) and has a contact seat (131), multiple contact slots (132) and a positive contact recess (133). The contact seat (131) has multiple side edges formed on the contact seat (131). The contact slots (132) are formed vertically in the side edges of the contact seat (131). The positive contact recess (133) is formed at the bottom of the base (10) and communicates with the contact seat (131) of the positive terminal seat (13).

The negative terminal seat (14) is formed at the edge of the base (10) opposite to the positive terminal seat (13), extends up from the bottom of the base (10) and has a contact seat (141), multiple contact slots (142) and a through hole (143). The contact seat (141) has multiple side edges formed on the contact seat (141). The contact slots (132) are formed vertically in the side edges of the contact seat (141). The through hole (143) is formed inward from the contact seat (141) and through the bottom of the base (10).

The sidewall (12) is formed at the edge of the base (10), extends up from the bottom of the base (10), connects to the negative terminal seat (14) and the positive terminal seat (13) and has a top inner edge and multiple lips (121). The lips (121) are formed separately on the top inner edge and extend radially inward.

The battery cavity (11) is defined on the base (10) inside the sidewall (12) and between the positive terminal seat (13) and the negative terminal seat (14) and has a negative contact recess (112). The negative contact recess (112) is formed in the bottom of the base (10) and communicates with and extends radially inward from the through hole (143) of the negative terminal seat (14). Since the battery cavity (11) is enclosed by the sidewall (12) that is connected to the positive terminal seat (13), the negative terminal seat (14) and the bottom of the base (10), the sidewall (12) will not detach from the bottom of the base (10) even if a crack forms in the sidewall (12). Consequently, the battery cavity (11) will still hold the battery (40), and the battery (40) will not fall out of the battery seat.

The positive terminal (20) is mounted on the positive terminal seat (13) and has a cap (21), a positive contact (22) and a tab (23). The cap (21) is securely mounted on the contact seat (131) and extends into the contact slots (132) in the positive terminal seat (13). The positive contact (22) is resilient, is connected to the cap (21) of the positive terminal (20), extends into the positive contact recess (133) in the base (10) and the battery cavity (11) and has a top end. The positive contact (22) presses against the positive terminal of a battery mounted in the battery cavity (11). The tab (23) is connected to the top end of the positive contact (22) and faces the battery cavity (11) of the base (10). Pressing the tab (23) toward the cap (21) allows a battery to be removed from the battery cavity (11).

The negative terminal (30) is mounted on the negative terminal seat (14) and has a cap (31) and a negative contact (32). The cap (31) is mounted securely on the contact seat (141), and extends into the contact slots (142) in the negative terminal seat (14) and the through hole (143). The negative contact (32) is resilient, is connected to the cap (31) of the negative terminal (30), extends from the through hole (143) toward the negative contact recess (112) in the battery cavity (11) and presses against a negative terminal of a battery mounted in the battery cavity (11).

Figure 3:
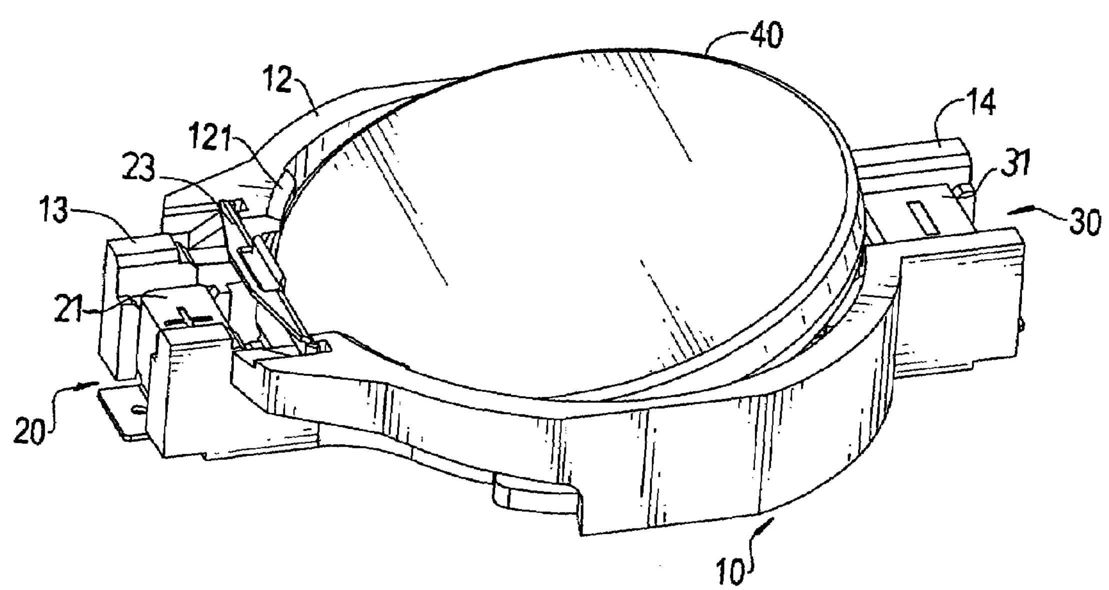
FIG. 3 is an operational perspective view of the battery seat in FIG. 1 with a battery being inserted.

With reference to FIGS. 3 and 4, a battery (40) is inserted into the battery cavity (11) by pushing the tab (23) and positive contact (22) of the positive terminal (20) toward the cap (21). The battery (40) is inserted under the lips (121) on the sidewall (12) and the negative terminal of the battery (40) presses against the negative contact (32) of the negative terminal (30). After the battery (40) is in the battery cavity (11), the tab (23) is released, and the positive contact (22) presses against the positive terminal of the battery (40).

Figure 6:
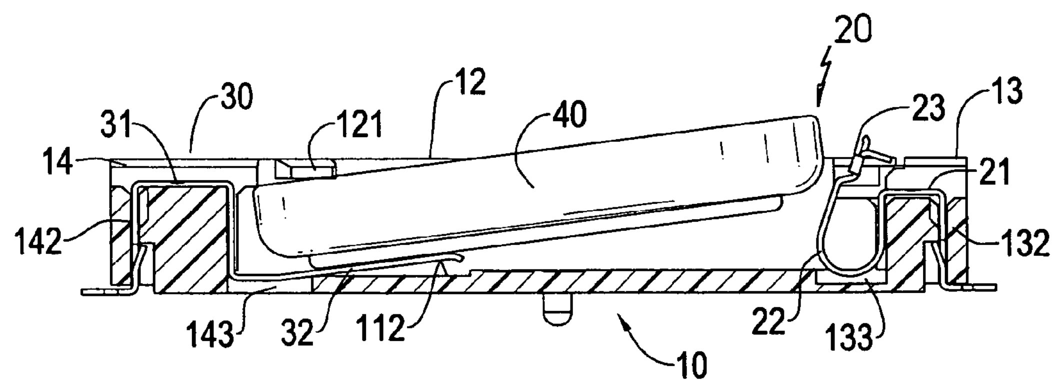
FIG. 6 is a side view in partial section of the battery seat in FIG. 5.
Figure 5:
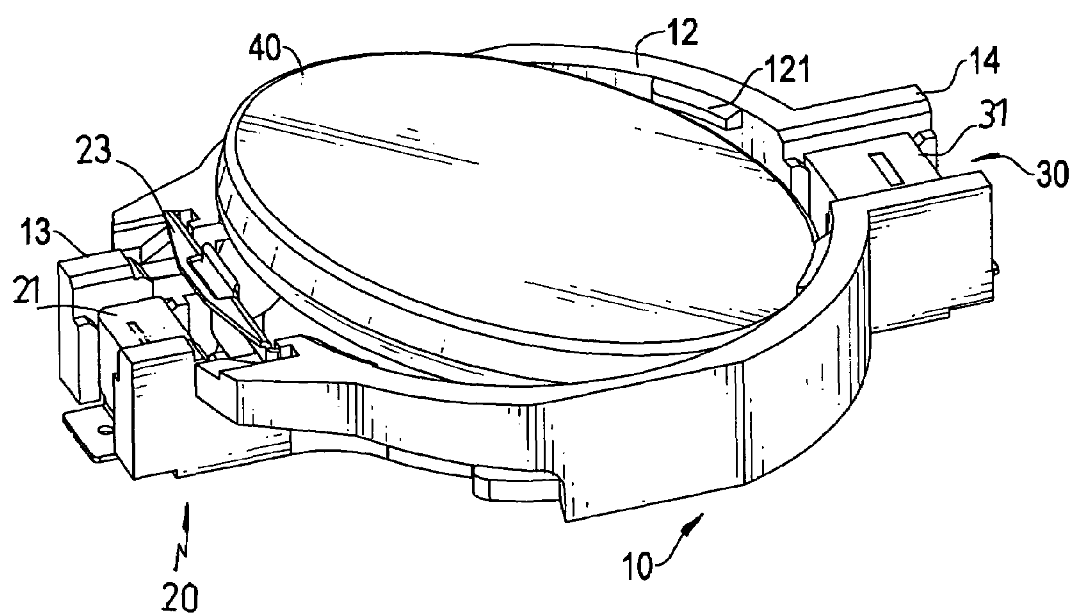
FIG. 5 is an operational perspective view of the battery seat in FIG. 1 with the battery being removed.
Figure 7:
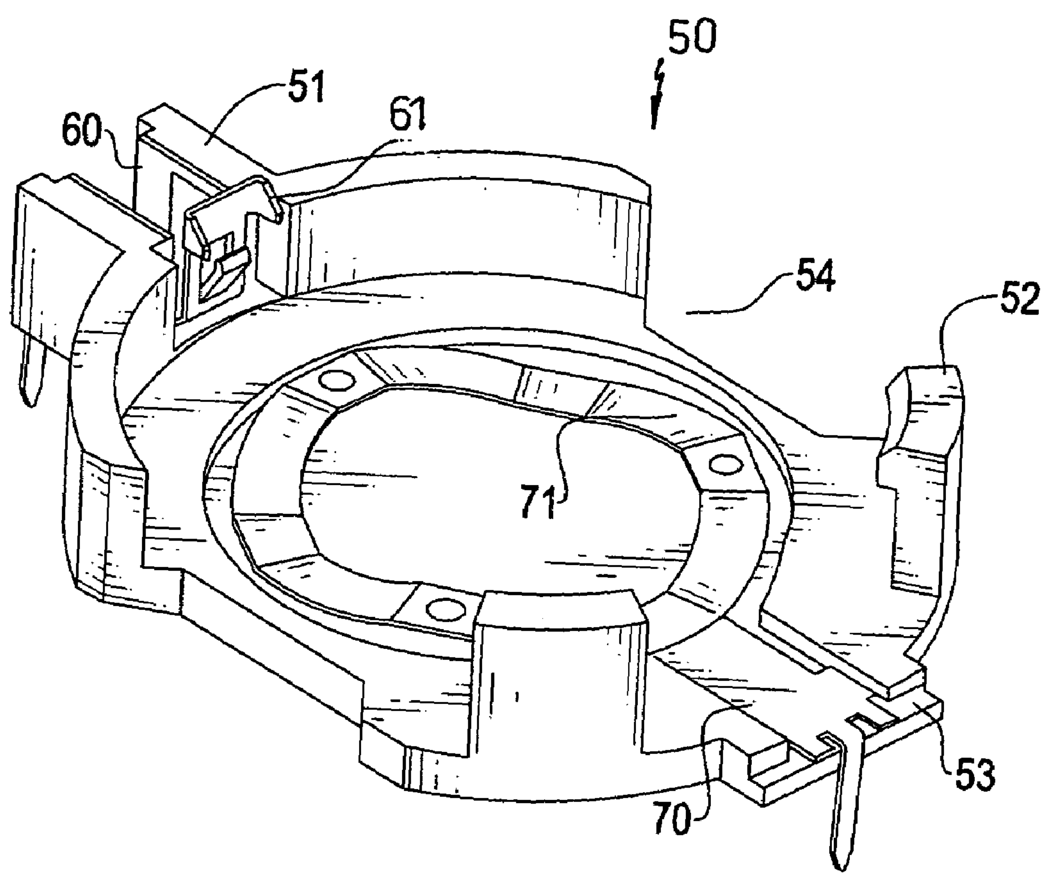
FIG. 7 is a perspective view of a conventional battery seat in accordance with the prior art.
Figure 8:
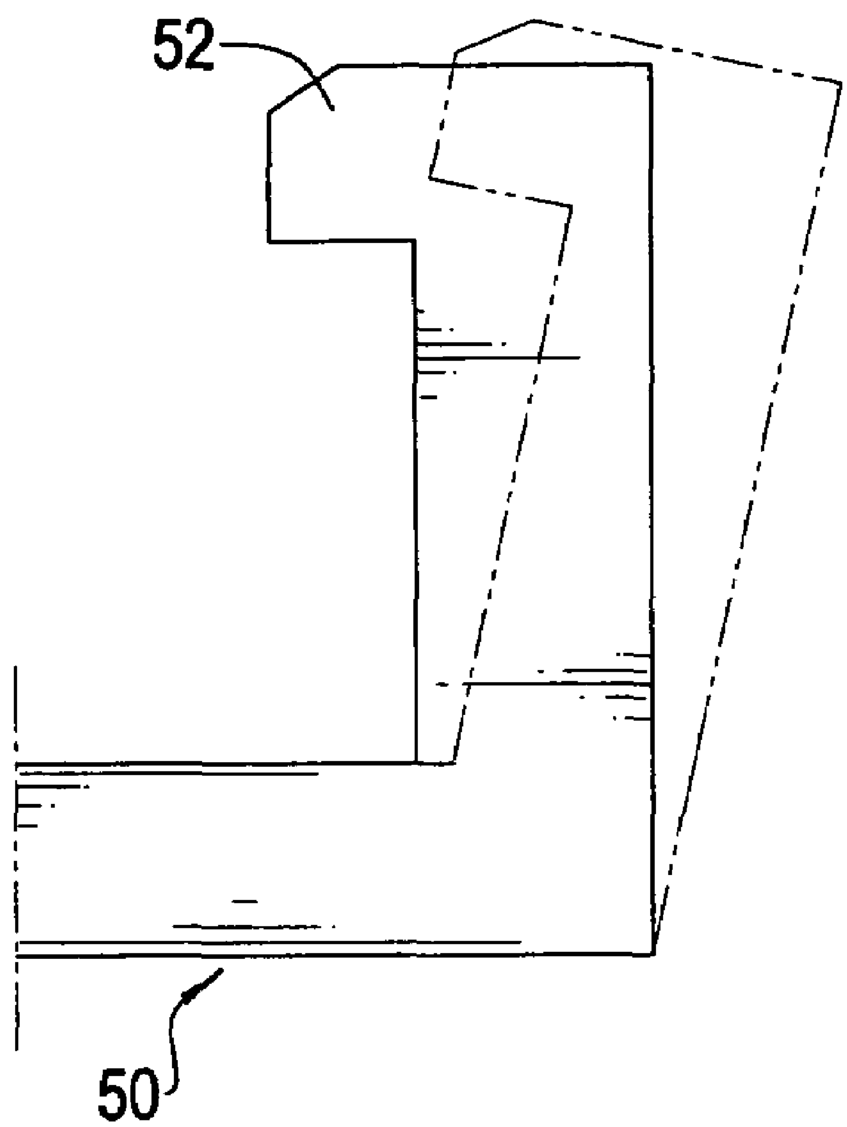
FIG. 8 is an operational perspective view of a stationary battery-clip of the conventional battery seat in FIG. 7.

With reference to FIGS. 5 and 6, the battery (40) is removed from the battery seat by pushing the tab (23) toward the positive terminal (20). The sidewall (12) near the negative terminal (30) deforms and the lips (121) of the sidewall (12) near the positive terminal (20) release the edge of the battery (40). The negative contact (32) of the negative terminal (30) pushes the battery (40) out of the battery cavity (11) so the battery (40) can be easily removed from the battery seat.

Even though numerous characteristics and advantages of the present invention have been set forth in the foregoing description together with details of the structure and function of the invention, the disclosure is illustrative only. Changes may be made in detail especially in matters of shape, size, and arrangement of parts within the principles of the invention to the full extent indicated by the broad general meaning of the terms in which the appended claims are expressed.

What is claimed is:

1. A battery seat comprising:

a base having a bottom and an edge;

a positive terminal seat formed at the edge of the base and extending up from the bottom of the base;

a negative terminal seat formed at the edge of the base opposite to the positive terminal seat and extending up from the bottom of the base;

a sidewall formed at the edge of base, extending up from the bottom of the base, connecting to the positive terminal seat and the negative terminal seat, said sidewall having a top inner edge, multiple lips formed separately on the top inner edge and extending radially inward and a recessed accommodating portion defining at least one angled wall;

a battery cavity defined on the base inside the sidewall and between the positive terminal seat and the negative terminal seat;

a positive terminal mounted on the positive terminal seat having a positive contact and a tab, said positive contact adapted to press against a positive terminal of a battery mounted in the battery cavity, said tab connecting to a top end of the positive contact and facing the battery cavity; said tab being actuable to displace within said recessed accommodating portion against said angled wall for responsive deflection of at least one of said multiple lips; and a negative terminal mounted on the negative terminal seat having a negative contact connecting to the negative terminal, said negative contact being located in the bottom of the base and adapted to press against a negative terminal of the battery mounted in the battery cavity.

2. The battery seat as claimed in claim 1, wherein the base includes a positive contact recess formed on the bottom of the base, a through hole formed through the bottom of the base and a negative contact recess formed in the bottom of the base, communicating with the through hole in the base and extending radially inward;

said positive terminal seat includes a contact seat communicating with the positive contact recess of the base and having multiple side edges, said multiple side edges including multiple contact slots formed therein;

the negative terminal seat having a contact seat communicating with the through hole in the base and having multiple side edges, said multiple side edges including multiple contact slots formed therein;

the positive terminal having a seat extending into the contact slots of the positive terminal seat and securely mounted on the contact seat of the positive terminal seat and connecting to the positive contact of the positive terminal; and the negative terminal having a seat extending into the contact slots in the negative terminal seat and securely mounted on the contact seat of the negative terminal seat and connecting to the negative contact of the negative terminal.

3. A battery seat comprising:

a base having a bottom;

an edge;

a positive terminal seat formed at the edge of the base, extending up from the bottom of the base and having a contact seat having multiple side edges formed on the contact seat;

multiple contact slots formed vertically in the side edges of the contact seat; and a positive contact recess formed at the bottom of the base and communicating with the contact seat of the positive terminal seat;

a negative terminal seat formed at the edge of the base opposite to the positive terminal seat, extending up from the bottom of the base and having a contact seat having multiple side edges formed on the contact seat;

multiple contact slots formed vertically in the side edges of the contact seat; and a through hole formed inward from the contact seat and through the bottom of the base;

a sidewall formed at the edge of the base, extending up from the bottom of the base, connecting to the negative terminal seat and the positive terminal seat and having a top inner edge; and multiple lips formed separately on the top inner edge and extending radially inward, said sidewall having a recessed accommodating portion defining at least one angled wall;

a battery cavity defined on the base inside the sidewall between the positive terminal seat and the negative terminal seat and having a negative contact recess formed in the bottom of the base and communicating with and extends radially inward from the through hole in the negative terminal seat;

a positive terminal mounted on the positive terminal seat and having a cap securely mounted on the contact seat and extending into the contact slots in the positive terminal seat;

a positive contact being resilient, connected to the cap of the positive terminal, extending into the positive contact recess in the base and the battery cavity and having a top end; and a tab connected to the top end of the positive contact and facing the battery cavity of the base, said tab being actuable to displace within said recessed accommodating portion against said angled wall for responsive deflection of at least one of said multiple lips; and a negative terminal mounted on the negative terminal seat and having a cap mounted securely on the contact seat and extending into the contact slots in the negative terminal seat and the through hole; and a negative contact being resilient, connected to the cap of the negative terminal and extending from the through hole toward the negative contact recess in the battery cavity.

* * * * *